United States Patent [19]

Lüssi et al.

[11] Patent Number: 5,564,662
[45] Date of Patent: Oct. 15, 1996

[54] UNEVEN FLOOR COMPENSATING SYSTEM FOR SURGERY TABLES

[75] Inventors: André R. Lüssi, Bern, Switzerland; Keith A. Stickley, Greenville, Ohio

[73] Assignee: Midmark Corporation, Versailles, Ohio

[21] Appl. No.: 290,234

[22] Filed: Aug. 15, 1994

[51] Int. Cl.⁶ .......................... A61G 13/00; F16M 11/00
[52] U.S. Cl. ...................... 248/188.2; 248/550; 248/649; 5/310
[58] Field of Search ................................. 248/550, 188.2, 248/188.5, 188.1, 677, 901, 649; 5/310, 311

[56] References Cited

U.S. PATENT DOCUMENTS

| | | | |
|---|---|---|---|
| 2,120,732 | 6/1938 | Comper et al. | 311/7 |
| 2,306,031 | 12/1942 | Anderson et al. | 311/5 |
| 2,605,151 | 7/1952 | Shampaine | 311/7 |
| 2,908,472 | 10/1959 | McDonald | 248/469 X |
| 3,041,121 | 6/1962 | Comper | 311/7 |
| 3,215,834 | 11/1965 | Tayman | 250/54 |
| 3,281,101 | 10/1966 | May | 248/550 |
| 3,281,141 | 10/1966 | Smiley et al. | 269/325 |
| 3,310,263 | 3/1967 | Cavanaugh | 248/649 |
| 3,411,766 | 11/1968 | Lanigan | 269/325 |
| 3,452,977 | 7/1969 | Ryman | 269/324 |
| 3,659,814 | 5/1972 | Rode | 248/649 |
| 3,724,004 | 4/1973 | Behrens | 5/68 |
| 3,754,749 | 8/1973 | Lyon et al. | 269/325 |
| 3,851,870 | 12/1974 | Cook | 269/322 |
| 3,868,103 | 2/1975 | Pageot et al. | 269/325 |
| 3,879,796 | 4/1975 | Whyte | 248/188.5 X |
| 3,905,591 | 9/1975 | Schorr et al. | 269/328 |
| 3,967,128 | 6/1976 | Smulewicz | 250/444 |
| 3,997,792 | 12/1976 | Conrad et al. | 250/444 |
| 4,148,472 | 4/1979 | Rais et al. | 269/325 |
| 4,186,917 | 2/1980 | Rais et al. | 269/325 |
| 4,287,422 | 9/1981 | Kuphal et al. | 250/439 R |
| 4,464,780 | 8/1984 | Ruiz | 378/178 |
| 4,477,045 | 10/1984 | Karasawa et al. | 248/550 X |
| 4,501,414 | 2/1985 | Mason et al. | 269/325 |
| 4,589,124 | 5/1986 | Ruiz | 378/178 |
| 4,625,424 | 12/1986 | de la Haye | 248/649 X |
| 4,628,556 | 12/1986 | Blackman | 248/550 X |
| 4,665,574 | 5/1987 | Filips et al. | 5/462 |
| 4,761,000 | 8/1988 | Fisher et al. | 269/323 |
| 4,865,303 | 9/1989 | Hall | 269/325 |
| 4,872,657 | 10/1989 | Lussi | 269/325 |
| 4,956,592 | 9/1990 | Schulte et al. | 318/560 |
| 4,991,805 | 2/1991 | Solak et al. | 248/649 X |
| 4,995,067 | 2/1991 | Royster et al. | 378/177 |
| 5,016,268 | 5/1991 | Lotman | 378/177 |
| 5,038,835 | 8/1991 | Breyer | 248/550 X |
| 5,166,968 | 11/1992 | Morse | 378/177 |
| 5,285,995 | 2/1994 | Gonzalez et al. | 248/550 |
| 5,345,632 | 9/1994 | Langenaeken et al. | 5/601 |

FOREIGN PATENT DOCUMENTS

| | | | |
|---|---|---|---|
| 3940666 | 1/1991 | Germany | 5/310 |

OTHER PUBLICATIONS

Chicmate General Surgical Table (Brochure) by Kirschner Chick Surgical Systems.
Chick 702 Orthopedic & Surgical Operating Table (Brochure) by Kirschner Chick Orthopedic Products.

Primary Examiner—Karen J. Chotkowski
Attorney, Agent, or Firm—Biebel & French

[57] ABSTRACT

A floor lock system for supporting a surgery table having a patient support surface supported by a base member and defining a longitudinal axis. The system includes first and second primary lock members located on laterally opposite sides of the longitudinal axis for the base member. A third primary lock member is located generally along the longitudinal axis and the first and second secondary lock members are located on laterally opposite sides of the longitudinal axis. The primary lock members are actuated by first actuators for movement toward a floor surface with a first force and the secondary lock members are actuated by second actuators for movement toward the floor surface with a second force less than the first force.

20 Claims, 3 Drawing Sheets

UNEVEN FLOOR COMPENSATING SYSTEM FOR SURGERY TABLES

BACKGROUND OF THE INVENTION

The present invention relates to a floor lock system for a surgery table and, more particularly, to a floor lock system for supporting a surgery table on an uneven floor surface.

Surgery tables are typically formed as portable units supported on casters whereby the table may be transported between rooms of a hospital and/or moved to desired orientations within an operating room. Once the surgery table is located at a desired position, floor locks may be engaged to positively lock the table in its desired position to thereby prevent movement of the table during an operation. For example, vertically moveable legs may be provided at each of four corners of the table wherein the legs, are moved downwardly into engagement with the floor. Upon engaging the floor, the legs cause the surgery table to move upwardly such that the table is supported by the legs.

One problem associated with the above-described floor lock system wherein vertically moveable legs are provided occurs when the floor surface is irregular or uneven such that the table is permitted to wobble slightly due to at least one of the legs being located in spaced relation to the floor surface when the other three legs are engaged with the floor. For example, floor irregularities may be on the order of one-quarter inch. In order to compensate for irregularities in the floor surface, one of the vertically moveable legs may be provided with an adjustable floor engaging portion wherein the adjustable floor engaging portion may be manually screwed in or out of the vertically moveable leg in order to adjust the length of the leg. This solution has proven to be inconvenient in that if it is desired to move the surgery table, it is either necessary to mark the locations for positioning the support legs or adjust the legs each time the table is moved.

Further, such a support system may permit a small amount of wobbling during a surgical operation. During certain delicate operations, such as microsurgery operations, even small movements of the table are undesirable.

Accordingly, there is a need for a floor lock system for use with a surgery table wherein the system is capable of automatically compensating for any irregularities in a floor surface.

SUMMARY OF THE INVENTION

The present invention provides a floor lock system for use with a surgery table wherein the floor lock system adjusts for irregularities in floor surfaces to thereby provide a stable support for the table.

In one aspect of the invention, a floor lock system is provided for supporting a base member of a surgery table on a floor surface the system including primary lock members supported on the base member and actuated by a first actuator for causing the primary lock members to engage the floor surface. At least one secondary lock member is provided supported on the base member and actuated by a second actuator for causing the secondary lock member to engage the floor surface. The first actuator is adapted to apply a greater force to the primary lock members than a force applied by the second actuator to the secondary lock member.

In a further aspect of the invention, the surgery table supported by the floor lock system includes a patient support surface supported by the base member and defining a longitudinal axis. First and second ones of the primary lock members are located on laterally opposite sides of the longitudinal axis adjacent to a head end of the table and a third primary lock member is located adjacent to a foot end of the table generally aligned along the longitudinal axis. First and second secondary lock members are located on laterally opposite sides of the longitudinal axis adjacent to the third primary lock member.

In operating the floor lock system of the present invention, the primary lock members are initially moved into engagement with the floor surface and extended to a predetermined position lifting the surgery table from the floor surface. Subsequently, the secondary lock members are actuated to move into engagement with the floor surface. The secondary lock members move an indeterminate distance until they contact the floor surface. The mechanism for actuating the secondary lock members applies a lesser force than the mechanism for actuating the primary lock members such that the secondary lock members do not provide a lift force to the surgery table but provide an anti-tilt function while compensating for irregularities in the floor surface. The primary and secondary lock members preferably comprise legs actuated for vertical movement by first and second cylinders forming the first and second actuators.

Therefore, it is an object of the present invention to provide a floor lock system for use with a surgery table wherein lock members are actuated to automatically compensate for irregularities in a floor surface.

It is a further object of the invention to provide such a floor lock system wherein a first set of lock members are provided for lifting the table and a second set of lock members compensate for irregularities in the floor surface and provide an anti-tilt function for the table.

It is yet another object of the invention to provide such a floor lock system wherein manual adjustment of the lock members is not required to obtain proper adjustment for uneven or irregular floor surfaces.

Other objects and advantages of the invention will be apparent from the following description, the accompanying drawings and the appended claims.

DETAILED DESCRIPTION OF THE PREFERRED EMBODIMENT

Figure 1:
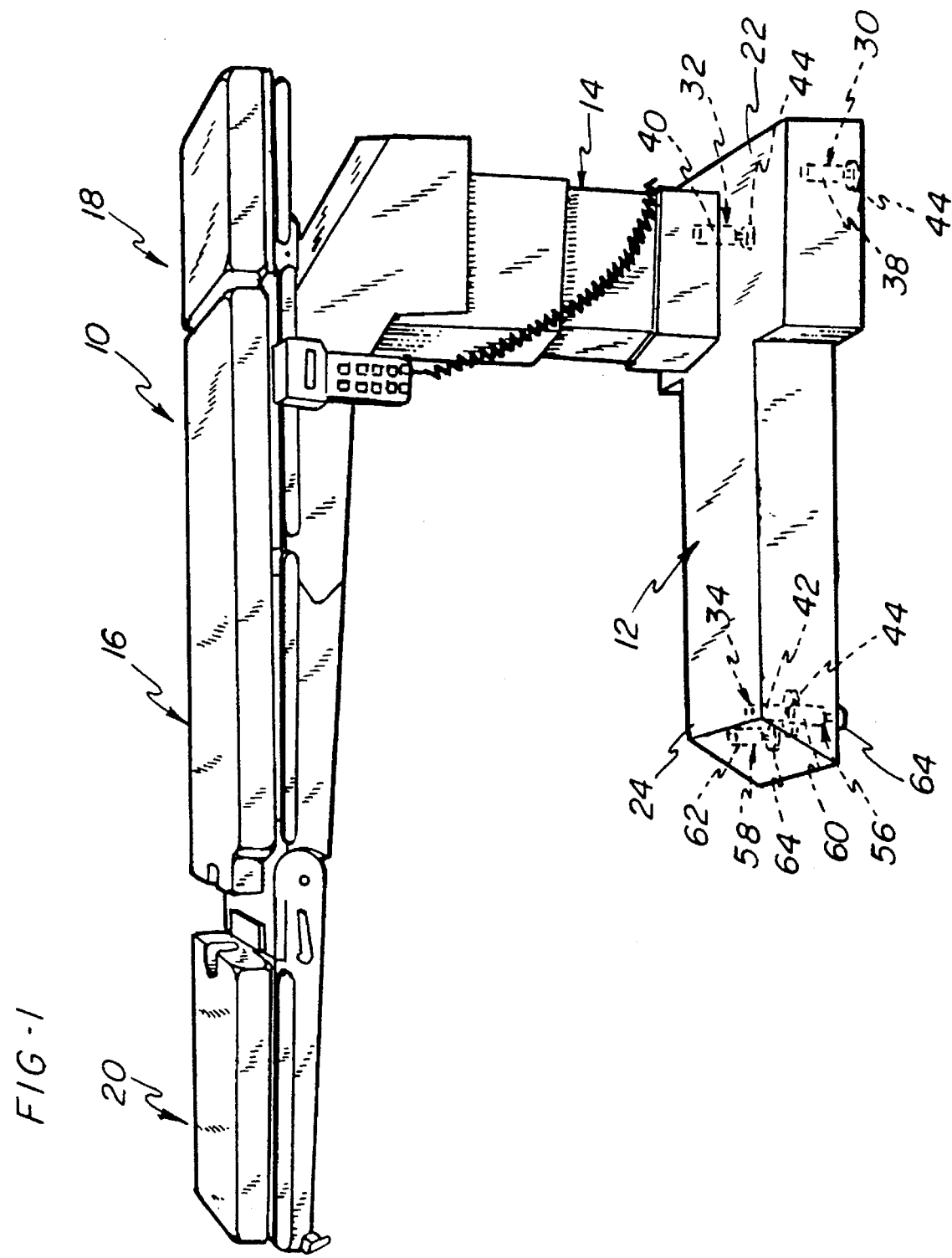
FIG. 1 is a perspective view of a surgery table incorporating the floor lock system of the present invention.

Referring to FIG. 1, the floor lock system of the present invention is adapted to be used in combination with a surgery table 10 having a base 12, a support column 14 extending upwardly from an end of the base 12, and a table top 16 supported at the top of the column 14. It should be noted that the table top extends in cantilever manner from a head end 18 of the table 10 toward a foot end 20 thereof. Further, the base 12 includes a head end portion 22 adjacent to the column 14 and a foot end portion 24 located distal from the column 14.

Figure 2:
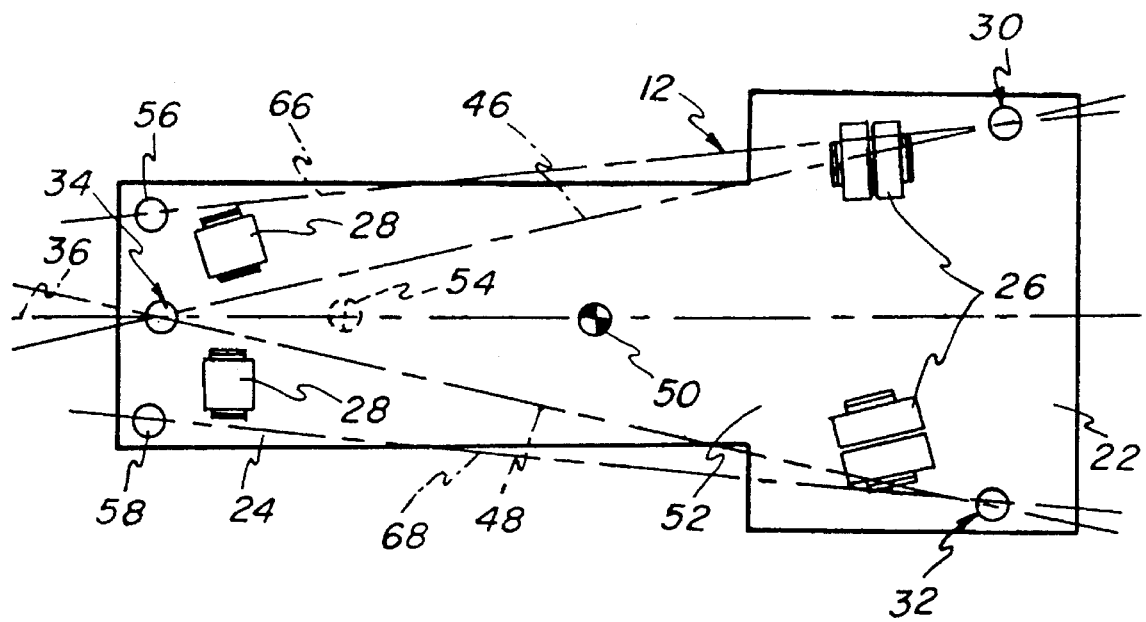
FIG. 2 is a bottom plan view of the surgery table of FIG. 1.

Referring to FIG. 2, the table 10 is further provided with rear casters 26 and front casters 28 which are freely movable to guide the table 10 in rolling movement across a floor surface.

Referring to FIGS. 1 and 2, the floor lock system of the present invention includes primary lock members comprising first and second primary lock members 30 and 32 adjacent to the head end portion 22 and a third primary lock member 34 adjacent to the foot end portion 24. The third primary lock member 34 is located generally along a longitudinal axis 36 defined by the base member 12, which longitudinal axis corresponds to a longitudinal axis for the table 10. The primary lock members 30, 32, 34 are actuated for movement by an actuator or actuator system comprising respective fluid actuated cylinders 38, 40, 42 for moving legs or floor engaging members 44 into engagement with a floor surface 70 (see also FIGS. 3 and 4). The first and second primary lock members 30, 32 are located substantially equidistant from the third lock member 34 and a primary tip line 46 is defined extending between the first and third primary lock members 30 and 34. Another primary tip line 48 is defined extending between the second and third primary lock members 32 and 34. The primary tip lines 46 and 48 define the sides of a triangle wherein the center of gravity 50 for the table is located within the triangular area circumscribed by the primary lock members 30, 32, 34.

It should be noted that under normal circumstances, when a patient is positioned on the table top 16, the resulting center of gravity will lie within the triangular area 52. However, under certain circumstances the center of gravity may shift outside of the triangular area 52 such that a tipping force applied laterally outside of either the line 46 or line 48 will be applied to the table 10 causing the table 10 to have a tendency to tip. For example, when a patient is positioned in a reverse position on the table the center of gravity may shift to a point such as the location identified as 54 in FIG. 2. In this instance, the center of gravity at 54 is relatively close to the sides of the triangle 52 defined by the lines 46 and 48 such that any forces applied adjacent to the foot end 20 of the table 10 will likely result in a tipping force being applied to the table 10. Such a reversal of the patient on a surgery table and the associated reconfiguration of the table which may cause such a shift in the center of gravity toward the foot end of the table is described further in U.S. Application Serial No. (attorney Docket MID 171P2), assigned to the assignee of the present invention and incorporated herein by reference.

Referring to FIGS. 1 and 2, in order to further stabilize the table, first and second secondary lock members 56 and 58 are provided located on laterally opposite sides of the longitudinal axis 36 at the head end 24 adjacent to the third primary lock member 34. The secondary lock members 56, 58 include a second actuator or actuator system comprising second actuation cylinders 60 and 62 for moving legs or floor engaging members 64 into engagement with a floor surface.

As seen in FIG. 2, a secondary tip line 66 is defined between the first primary lock member 30 and the first secondary lock member 56, and another secondary tip line 68 is defined between the second primary lock member 32 and the second secondary lock member 58. The secondary tip lines 66 and 68 are located laterally outwardly from the location of the primary tip lines 46 and 48 such that a relatively larger force must be applied to the table 10 in order to cause it to tip. Further, a greater proportion of the patient's weight will be located within the area defined between the lines 66 and 68 such that a greater restoring force resisting tipping is provided to the table when the secondary lock members 56 and 58 are engaged with the floor surface 70.

Figure 3:
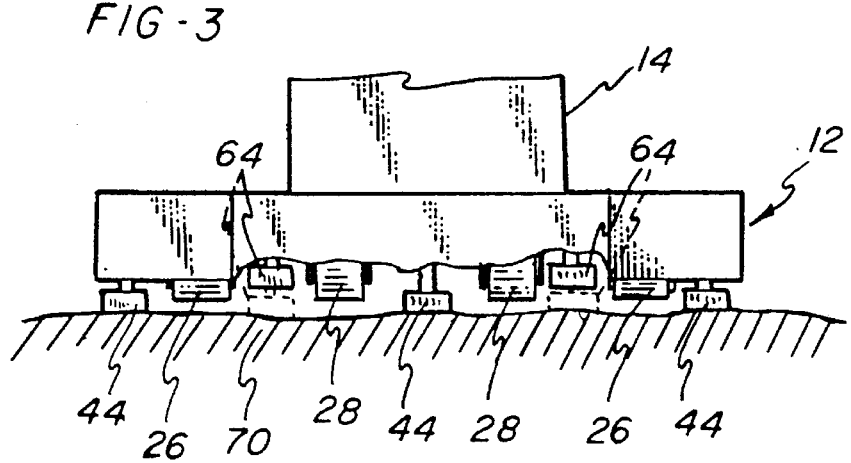
FIG. 3 is a front elevational view of the base portion of the surgery table of FIG. 1 wherein the base is partially cut away.
Figure 4:
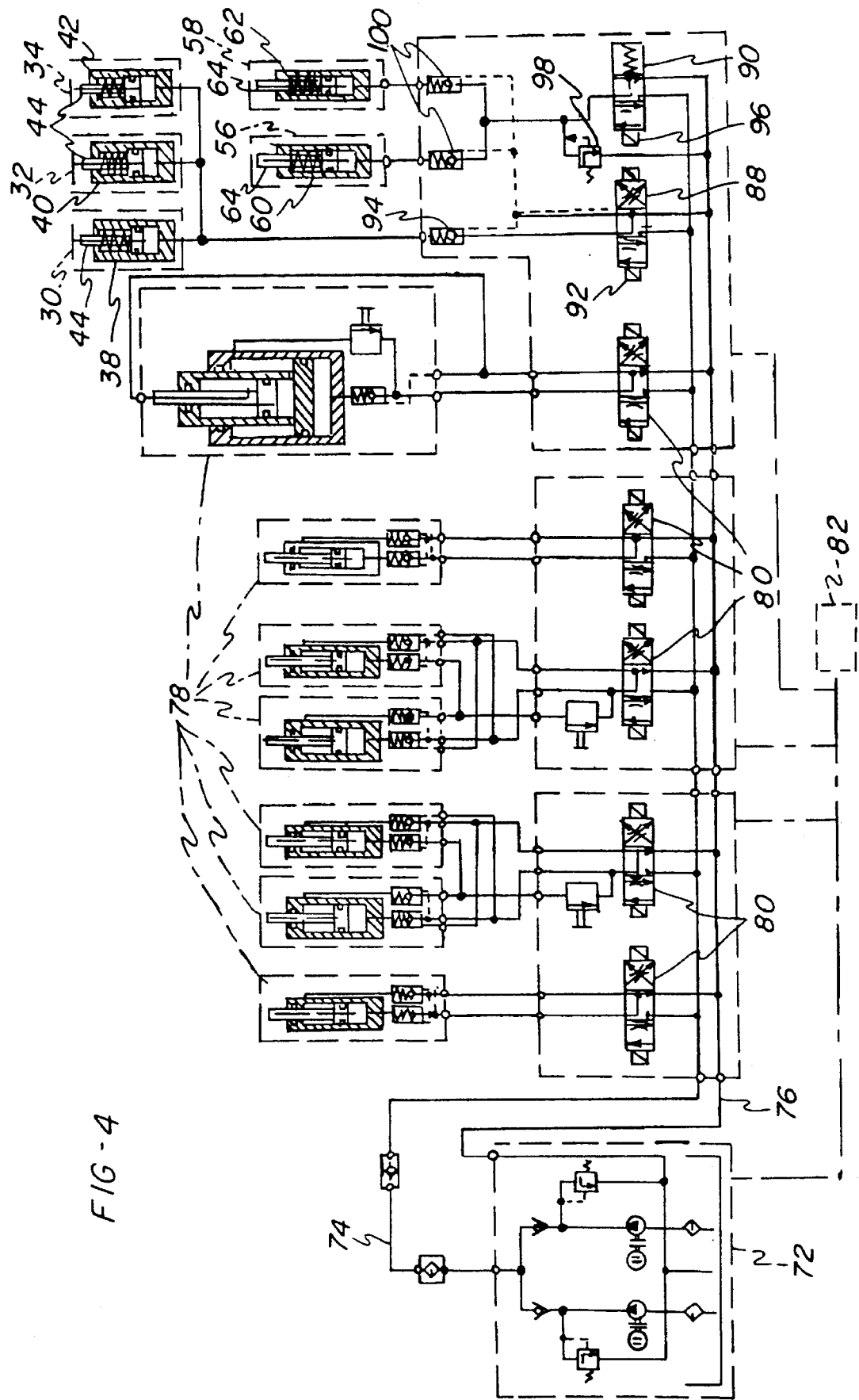
FIG. 4 is a diagrammatic view of a fluid system for controlling the cylinder actuators for the floor locks.

Referring to FIGS. 3 and 4, it should be noted that the actuation cylinders 38, 40, 42 for the primary lock members are adapted to apply a greater force than the force applied by the cylinders 60 and 62 of the secondary lock members. The cylinders 38, 40, 42 apply a sufficiently large force to fully extend and lift the casters 26 and 28 clear of the floor surface 70. Thus, the floor engaging members 44 define a plane for supporting the table 10. Subsequent to the primary floor engaging members 44 engaging the floor surface 70, the secondary floor engaging members 64 move downwardly into engagement with the floor surface 70, as depicted in dotted lines in FIG. 3. The combined force applied by the secondary cylinders 60 and 62 to the floor engaging members 64 is insufficient to lift the table upon engaging the floor surface 70. Thus, as the floor engaging members 64 move into engagement with the floor surface 70 the table remains supported within the plane defined by the primary floor engaging members 44, and the secondary floor engaging members 64 merely provide a force counteracting tipping of the table by moving the tip lines for the table laterally outwardly. Further, it should be noted that as a result of the cylinders 60 and 62 not providing a force sufficient to lift the table, the movement of the floor engaging members 64 will terminate upon engagement with the floor surface 70 such that they will automatically compensate for any irregularities in the floor surface, and may be located in perpendicular spaced relation to the plane defined by the engaging members 44, while providing a wobble-free stable support for the table 10.

Referring to FIG. 4, a hydraulic circuit for actuating the floor lock system of the present invention is illustrated diagrammatically and is shown as part of a hydraulic system for actuating different articulated portions of the surgery table 10. The hydraulic system includes a pump system 72 defining a pressurized fluid source having an output line 74 and a return line 76 wherein the output and return lines 74, 76 are connected to a plurality of actuators 78 through control valves 80 for controlling articulated sections of the table 10. The details of the pump system 72, actuators 78 and control valves 80 are described further in the above referenced U.S. Patent Application No. (Attorney Docket No. MID 171 P2).

The hydraulic system operates under control of a control system or controller 82 which is connected to first and second control valves 88, 90 for the floor lock system. The first control valve 88 is in fluid communication with the fluid actuated cylinders 38, 40, 42 of the respective primary lock members 30, 32, 34. Similarly, the second control valve 90 is in fluid communication with the actuation cylinders 60, 62 for the respective secondary lock members 56, 58.

During operation of the floor lock system, the controller 82 will initially energize the first control valve 88 such that a spool 92 of the valve 88 shifts to the right for a predetermined time period causing pressurized fluid to flow to the primary lock members 30, 32, 34. During the predetermined time period, the floor engaging members 44 will extend outwardly to the full extent of their travel to engage the floor with sufficient force to lift the casters 26, 28 of the surgery table 10 out of contact with the floor. Subsequently, the spool 92 will move to a neutral position and a check valve 94 will maintain the fluid pressure to the primary lock members 30, 32, 34.

The controller 82 will then actuate the second control valve 90 such that a spool 96 of the second control valve 90 moves to the right, resulting in pressurized fluid being supplied to the secondary lock members 56, 58. The fluid pressure supplied to the second actuation cylinders 60, 62 is limited to a predetermined pressure, such as 20 bar, by a pressure relief valve 98 whereby the fluid pressure supplied to the second actuation cylinders 60, 62 will be less than the fluid pressure supplied to the first actuation cylinders 38, 40, 42. Further, the relief valve 98 ensures that the fluid pressure supplied to the second actuation cylinders 60, 62 is less than the force necessary to provide an additional lifting force to the table 10.

After the pressurized fluid has teen supplied to the secondary lock members 56, 58 for a predetermined time period, the spool 96 for the second control valve 90 is de-energized such that it moves back to a neutral position and a pair of check valves 100 maintain the predetermined pressure within the second actuation cylinders 60, 62. It should be noted that the floor engaging members 64 for the secondary lock members 56, 58 will only extend to the extent that they contact the floor, at which time the pressure within the cylinders will increase to a point where the pressure relief valve 98 opens to maintain the predetermined pressure to the second actuation cylinders 60, 62. Thus, although the secondary lock members 56, 58 do not provide a lifting force to the table 10, the cylinders 60, 62 are provided with a sufficient force to resist movement when a tipping force is applied to the table 10.

When it is desired to release the floor lock system to lower the casters 26, 28 back into contact with the floor, the spool 92 of the first control valve 88 is caused to shift to the left thereby actuating the check valves 94, 100 to release fluid pressure to the return line 76. In response thereto, the floor engaging members 44 and 64 will move into their respective cylinders 38, 40, 42 and 60, 62 to lower the table 10.

From the above description, it should be apparent that the secondary lock members are adapted to move to an indeterminate position, as determined by irregularities in a floor surface, relative to the plane defined by the primary lock members whereby a highly stable support is provided for the surgery table for avoiding both tipping and wobbling of the table.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A floor lock system for supporting a base member on a floor surface, said system comprising:

a primary actuator system including first actuators located on said base member;

primary lock members on each of said first actuators, said primary actuation system exerting a first force on said primary lock members to move said primary lock members downwardly relative to said base member into engagement with said floor surface;

a secondary actuator system including secondary actuators located on said base member;

secondary lock members on each of said secondary actuators, said secondary actuation system exerting a second force on said secondary lock members to move said secondary lock members downwardly relative to said base member into engagement with said floor surface; and wherein said first force applied by said primary actuation system between said primary lock members and said floor is greater than said second force applied by said secondary actuation system between said secondary lock members and said floor.

2. The system as recited in claim 1 wherein said primary lock members circumscribe a triangular area on said floor surface and define a plane and at least one of said secondary lock members engages said floor surface at a point outside of said triangular area to resist movement of said plane in an angular direction relative to said floor surface.

3. The system as recited in claim 2 including two secondary lock members for engaging said floor surface at two points outside of said triangular area.

4. The system as recited in claim 1 wherein said primary lock members define two tip lines extending from one of said primary lock members to two other of said primary lock members.

5. The system as recited in claim 4 wherein said two other of said primary lock members are substantially equidistant from said one of said primary lock members.

6. The system as recited in claim 4 wherein said secondary lock members are located adjacent to said one of said primary lock members.

7. The system as recited in claim 1 wherein said first actuator comprises at least one first cylinder and said second actuator comprises at least one second cylinder.

8. The system as recited in claim 1 including three of said primary lock members arranged in a triangular pattern to define a plane and including two secondary lock members located adjacent to and on either side of an apex of said triangular pattern to resist an angular movement of said plane relative to said floor surface.

9. The system as recited in claim 1 wherein said first force is sufficient to move said base member upwardly away from said floor surface.

10. A floor lock system for supporting a surgery table having a patient support surface supported by a base member and defining a longitudinal axis, said system comprising:

first and second primary lock members mounted on said base member and located on laterally opposite sides of said longitudinal axis for supporting said base member, a third primary lock member mounted on said base member and located generally along said longitudinal axis for supporting said base member;

first and second secondary lock members mounted on said base member and located on laterally opposite sides of said longitudinal axis; and a secondary actuation system connected to said secondary lock members to actuate said secondary lock members to move into engagement with a floor surface with a force insufficient to lift said base member relative to said floor surface.

11. The system as recited in claim 10 wherein said first and second primary lock members are located adjacent to a first end of said table and said third primary lock member is located adjacent to a second end of said table.

12. The system as recited in claim 10 wherein said secondary lock members are located adjacent to and on laterally opposite sides of said third primary lock member.

13. The system as recited in claim 10 wherein said primary lock members are actuated by first actuators for movement toward a floor surface with a first force sufficient to move said base member upwardly away from said floor surface and said secondary lock members are actuated by second actuators for movement toward the floor surface with a second force less than said first force.

14. The system as recited in claim 10 wherein said first, second and third primary lock members define three support points for supporting substantially the entire weight of said surgery table.

15. The system as recited in claim 10 including first actuation cylinders for actuating said primary lock members and second actuation cylinders for actuating said secondary lock members, said first actuation cylinders moving said primary lock members to a predetermined stop position and said second actuation cylinders moving said secondary lock members an indeterminate amount into engagement with said floor surface.

16. A method of supporting a surgery table on an uneven floor surface comprising the steps of:

providing primary and secondary lock members supported on said surgery table;

actuating said primary lock members to move into engagement with a floor surface with a first force to support the weight of said surgery table; and actuating said secondary lock members to move into engagement with said floor surface with a second force less than said first force.

17. The method as recited in claim 16 wherein said primary lock members lift said surgery table from said floor surface and include lower floor engaging surfaces, said floor engaging surfaces defining a plane.

18. The method as recited in claim 17 wherein at least one of said secondary lock members is moved into engagement with said floor surface at a location perpendicularly spaced from said plane.

19. The method as recited in claim 16 wherein said primary lock members are actuated by first cylinders and said second lock members are actuated by second cylinders and including a controller for controlling actuation of said cylinders.

20. The method as recited in claim 16 wherein said primary lock members are moved to a predetermined position and said secondary lock members are moved to an indeterminate position.

\* \* \* \* \*